(12) United States Patent
Kameyama

(10) Patent No.: US 7,663,788 B2
(45) Date of Patent: Feb. 16, 2010

(54) IMAGE CORRECTING APPARATUS AND METHOD, AND IMAGE CORRECTION PROGRAM

(75) Inventor: Hirokazu Kameyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 727 days.

(21) Appl. No.: 11/168,409

(22) Filed: Jun. 29, 2005

(65) Prior Publication Data

US 2005/0286099 A1 Dec. 29, 2005

(30) Foreign Application Priority Data

Jun. 29, 2004 (JP) .............................. 2004-190598

(51) Int. Cl.
*G03F 3/08* (2006.01)
*G06F 15/00* (2006.01)
*G06K 9/00* (2006.01)

(52) U.S. Cl. ........................ 358/518; 358/1.9; 358/520; 382/167

(58) Field of Classification Search ................. 358/1.9, 358/518, 520, 530, 535, 534, 504, 1.13; 382/167, 382/162
See application file for complete search history.

(56) References Cited

U.S. PATENT DOCUMENTS

| | | | |
|---|---|---|---|
| 5,995,194 A * | 11/1999 | Terashita | 355/35 |
| 6,278,533 B1 * | 8/2001 | Takemoto | 358/521 |
| 6,285,410 B1 * | 9/2001 | Marni | 348/576 |
| 2002/0135618 A1 * | 9/2002 | Maes et al. | 345/767 |
| 2003/0053085 A1 * | 3/2003 | Takemoto | 358/1.9 |
| 2006/0257132 A1 * | 11/2006 | Shiffer et al. | 396/158 |
| 2008/0143854 A1 * | 6/2008 | Steinberg et al. | 348/239 |

FOREIGN PATENT DOCUMENTS

| | | | |
|---|---|---|---|
| JP | 5-100328 A | | 4/1993 |
| JP | 8-122944 A | | 5/1996 |
| JP | 2000-148978 A | | 5/2000 |
| JP | 2000-182043 A | | 6/2000 |
| JP | 2001-320591 A | | 11/2001 |
| JP | 2003-209856 A | | 7/2003 |
| JP | 2004-220555 A | | 8/2004 |

* cited by examiner

*Primary Examiner*—Madeleine A Nguyen
(74) *Attorney, Agent, or Firm*—Sughrue Mion, PLLC

(57) ABSTRACT

Fed image data is used, to respectively calculate two color correction values in two correction value calculating circuits. Further, a target skin color chromaticity value and significance levels indicating which of the two color correction values should be attached importance to are inputted from an input device. Respective confidence levels for the two color correction values are calculated on the basis of the two color correction values and the inputted target skin color chromaticity value. On the basis of the calculated confidence levels, the inputted significance levels, and the two color correction values, both of the confidence levels and the significance levels are reflected, to calculate a new color correction value in a color correction value calculating circuit.

17 Claims, 6 Drawing Sheets

IMAGE CORRECTING APPARATUS AND METHOD, AND IMAGE CORRECTION PROGRAM

BACKGROUND OF THE INVENTION

1. Field of the Invention

The present invention relates to an image processing apparatus and method for subjecting digital image data to color correction processing (color conversion processing), and a program for causing a computer to carry out the image processing method.

2. Description of the Background Art

In a case where color prints are produced from digital image data obtained by reading an image recorded on a photographic negative film or a reversal film using a scanner or the like or digital image data acquired by a digital camera or a cellular phone with a digital camera, the digital image data is subjected to color correction processing for correcting a color balance such that the same impression as that on a scene at the time of photographing is given to create a print image. The color correction processing is performed such that an achromatic color becomes appropriate by estimating a light source at the time of the photographing or estimating a color balance on the entire image from the image acquired by the photographing so that the color balance on the print image becomes appropriate.

In JP-A-2000-182043, a face area is first detected from inputted image data, and the entire image data is subjected to color conversion processing (color correction) such that the color of the detected face area becomes a desired color.

In JP-A-2000-182043, the color correction is made by paying attention to only a face area (a skin color area) in an image. The face area (skin-color area) differs in individuals. Therefore, there is a high possibility that the color correction becomes unnatural.

SUMMARY OF THE INVENTION

The present invention has been made in view of the foregoing circumstances and has for its object to allow for more suitable color correction (color balance correction) of image data.

Another object of the present invention is to allow for color correction of image data that meets a user's request.

An image correcting apparatus according to the present invention is characterized by comprising a plurality of types of color correction value calculation means for respectively calculating a plurality of color correction values by different color correction value calculation processings on the basis of given image data; confidence level calculation means for respectively calculating confidence levels for the plurality of color correction values calculated by the plurality of types of color correction value calculation means; adding color correction value calculation means for calculating a new color correction value obtained by respectively weighting the plurality of color correction values using the confidence levels for the plurality of color correction values calculated by the confidence level calculation means and adding the weighted plurality of color correction values; and correction means for color-correcting the image data on the basis of the new color correction value calculated by the adding color correction value calculation means.

An image correcting method according to the present invention is characterized by comprising the steps of respectively calculating a plurality of color correction values by different color correction value calculation processings on the basis of given image data; respectively calculating confidence levels for the calculated plurality of color correction values; calculating a new color correction value obtained by respectively weighting the plurality of color correction values using the calculated confidence levels for the plurality of color correction values and adding the weighted plurality of color correction values; and color-correcting the image data on the basis of the calculated new color correction value.

The present invention further provides a program for causing a computer to perform image correction processing (a program for causing a computer to serve as an image correcting apparatus). The program is for causing a computer to perform processing for respectively calculating a plurality of color correction values by different color correction value calculation processings on the basis of image data given from a storage device (a hard disk, a memory card, a CD-ROM, a DVD-ROM, etc.); processing for respectively calculating confidence levels for the calculated plurality of color correction values; processing for calculating a new color correction value obtained by respectively weighting the plurality of color correction values using the calculated confidence levels for the plurality of color correction values and adding the weighted plurality of color correction values; and processing for color-correcting the image data on the basis of the calculated new color correction value. A CPU included in the computer may be caused to perform all the processings, or a dedicated hardware device may be caused to perform some of the processings.

The color correction values are respectively calculated by the different color correction value calculation processings on the basis of the given image data. Namely, a plurality of color correction values is calculated.

A plurality of types of color correction value calculation processing respectively mean such color correction value calculation processings that they are common in terms of processing for calculating a color correction value but differs in the contents of the processing (data, an algorithm, etc. used for color correction value calculation). For example, processing for calculating a color correction value such that color information representing one particular color (e.g., a skin color, a white color, etc.) included in an image represented by image data has color information conforming to ideal color information, processing for calculating a color correction value such that color information representing a plurality of particular colors (e.g., a skin color and a gray color) has color information conforming to ideal color information, processing for estimating color temperature and the type of light source and calculating a color correction value conforming to the estimated color temperature and type of light source, and so forth are known. Out of the plurality of types of color correction value calculation processings, the two or more types of calculation processings can be employed as color correction value calculation processing (means).

The confidence levels are respectively calculated for the plurality of color correction values calculated by the plurality of types of color correction value calculation means. The confidence level indicates whether or not (the extent to which) the calculated color correction value can be suitably color-corrected.

For example, the respective confidence levels for the plurality of color correction values are calculated on the basis of color information relating to a representative color included in the image data, ideal color information relating to the representative color, and a plurality of corrected color information obtained by correcting the color information on the basis of the plurality of color correction values calculated by the plurality of types of color correction value calculation means.

As an example, it is possible to handle, in a color space (e.g., a chromaticity space), an angle formed between an ideal line segment vector obtained by connecting the color information and the ideal color information and each of a plurality of correction line segment vectors obtained by connecting the color information and the plurality of corrected color information as a value indicating to what extent each of the plurality of color correction values is reliable. If the angle formed between the ideal line segment vector and a correction line segment vector based on a given color correction value is small, it can be estimated that there is a high possibility that the color correction value can realize ideal color correction. In this case, the confidence level for the color correction value is increased (a confidence level having a large value corresponds thereto). Conversely, if the angle formed between the ideal line segment vector and a correction line segment vector based on a given color correction value is large, there is a high possibility that the color correction value is such a color correction value as to make color correction far from ideal. In this case, the confidence level for the color correction value is reduced (a confidence level having a small value corresponds thereto).

Of course, the calculation of the confidence level other than calculation of the confidence level based on the angle formed between the ideal line segment vector and the correction line segment vector can be also employed. In the color space, the respective confidence levels for the plurality of color correction values may be calculated on the basis of the magnitudes of the plurality of correction line segment vectors obtained by connecting the color information and the plurality of corrected color information. Alternatively, in the color space, the respective confidence levels for the plurality of color correction values may be calculated on the basis of the directions of the plurality of correction line segment vectors obtained by connecting the color information and the plurality of corrected color information. A value obtained by calculating the plurality of confidence levels for one color correction value and multiplying the confidence levels may be handled as a confidence level for the color correction value.

A new color correction value is calculated by using the respective confidence levels for the calculated plurality of color correction values, to weight the calculated plurality of color correction values and add the weighted plurality of color correction values. The calculated new color correction value is used, to color-correct the image data.

According to the present invention, the new color correction value used for the color correction of the image data is obtained by respectively weighting the plurality of color correction values using the confidence levels and adding the weighted plurality of color correction values. Therefore, the new color correction value becomes a value (a color correction value) on which the confidence levels for the plurality of color correction values are reflected. The possibility that the inappropriate color correction values are calculated is reduced, thereby allowing more appropriate color correction values to be obtained.

Preferably, the respective significance levels for the plurality of color correction values are inputted. The input of the significance levels is for accepting a user's request. Out of the plurality of color correction values, a significance level having a large value and a significance level having a small value are respectively inputted for the color correction value that is considered to be significant and the color correction value that is not considered to be significant by the user. In this case, the respective calculated confidence levels for the plurality of color correction values and the respective inputted significance levels for the plurality of color correction values are used, so that the calculated plurality of color correction values are respectively weighted. More appropriate color correction values that suits a user's taste can be obtained.

Of course, either one of the confidence level and the significance level may be weighted more greatly in the weighting. A new color correction value that is strongly affected by the confidence level and a new color correction value that is strongly affected by the significance level can be obtained.

The foregoing and other objects, features, aspects and advantages of the present invention will become more apparent from the following detailed description of the present invention when taken in conjunction with the accompanying drawings.

DESCRIPTION OF THE PREFERRED EMBODIEMNTS

An embodiment of the present invention will be described in accordance with the accompanying drawings.

Figure 1:
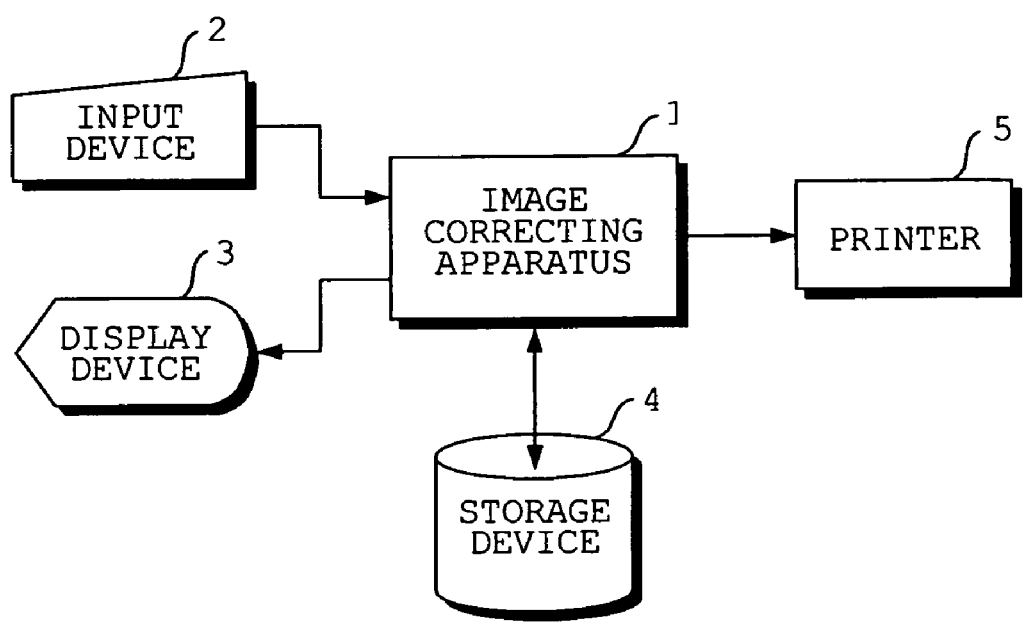
FIG. 1 is a block diagram showing the overall configuration of a digital printing system.
Figure 2:
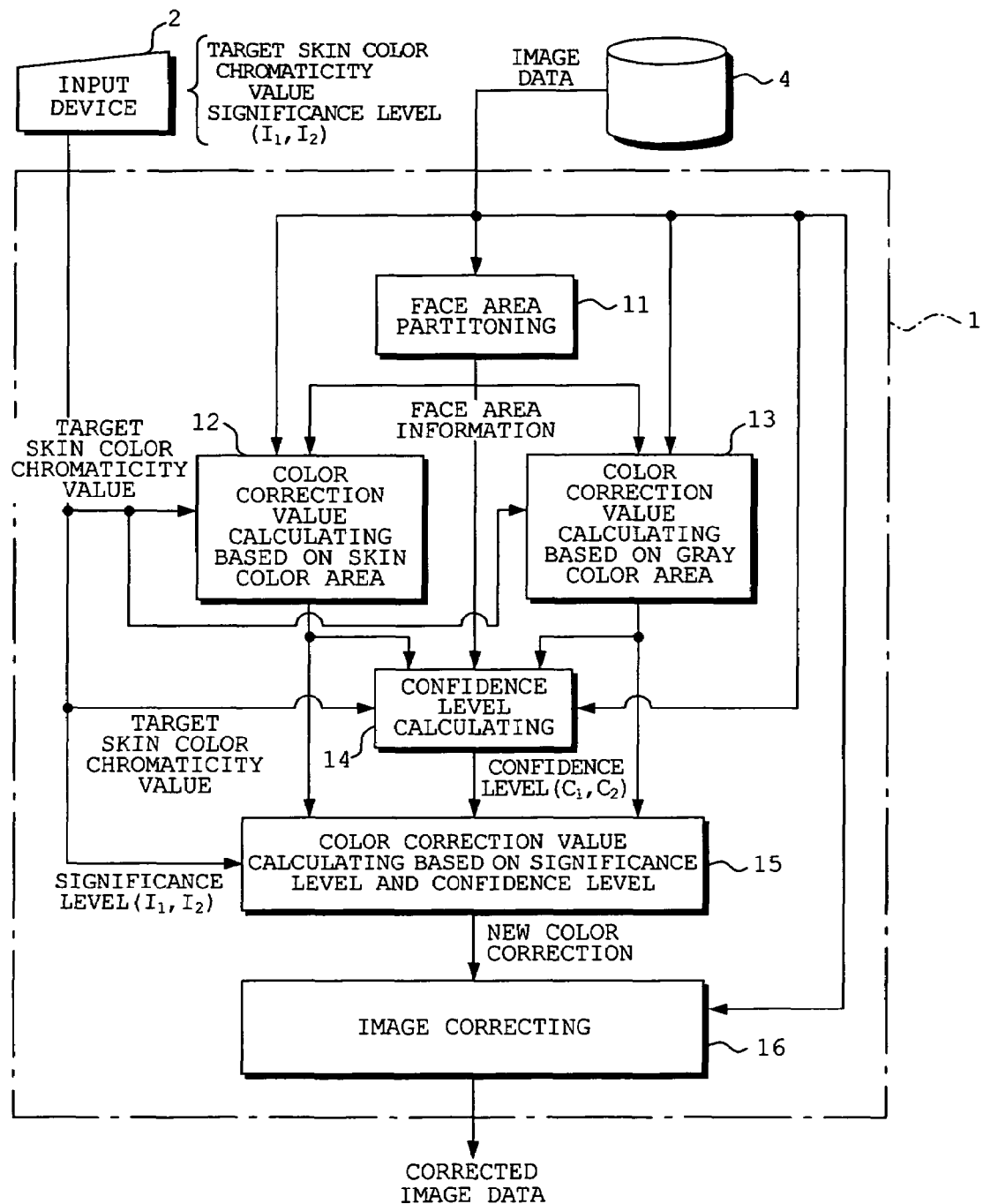
FIG. 2 is a block diagram showing the detailed electrical configuration of an image correcting apparatus together with the flow of data.

FIG. 1 is a block diagram showing the entire configuration of a digital printing system. The digital printing system comprises an image correcting apparatus 1, and peripheral equipment (an input device 2, a display device 3, a storage device 4, and a printer 5) connected to the image correcting apparatus 1. FIG. 2 is a block diagram showing the detailed electrical configuration of the image correcting apparatus 1 that is a core apparatus in the digital printing system, together with the flow of data. In FIG. 2, the illustration of the display device 3 and the printer 5 in the peripheral equipment shown in FIG. 1 is omitted.

The image correcting apparatus 1 is an apparatus for correcting image data such that an image represented by the given image data has a more appropriate color balance. The image correcting apparatus 1 subjects the fed image data to color balance correction, and outputs the image data that has been subjected to the color balance correction. In the specification, the color balance correction is hereinafter merely referred to as "color correction".

The input device 2 (a keyboard, a mouse, etc.) connected to the image correcting apparatus 1 is used for inputting parameters for color correction processing (a target (ideal) skin color chromaticity value and two significance levels). On a display screen of the display device 3 (a CRT display, a liquid crystal display, etc.), a screen for setting the parameters inputted from the input device 2, images represented by image data before and after the color correction, and so forth are displayed. The storage device (a hard disk, a memory card, a CD-ROM, etc.) 4 stores image data. The image data read out of the storage device 4 is subjected to color correction processing in the image correcting apparatus 1. The printer 5 prints an image represented by the image data after the color correction on printing paper or the like.

Referring to FIG. 2, the image correcting apparatus 1 comprises a face area partitioning circuit 11, a color correction value calculating circuit based on a skin color area (hereinafter referred to as a first color correction value calculating circuit) 12, a color correction value calculating circuit based on a gray color area (hereinafter referred to as a second color correction value calculating circuit) 13, a confidence level calculating circuit 14, a color correction value calculating circuit based on significance level(s) and confidence level(s) (hereinafter referred to as a significance/confidence-based color correction value calculating circuit) 15, and an image correcting circuit 16.

In the image correcting apparatus 1, the image correcting circuit 16 subjects the image data read out of the storage device 4 (hereinafter referred to as original image data) to color correction processing. The details of the color correction processing performed in the image correcting circuit 16 will be described later.

The color correction processing performed in the image correcting circuit 16 conforms to a color correction value calculated in the significance/confidence-based color correction value calculating circuit 15. The significance/confidence-based color correction value calculating circuit 15 calculates a color correction value (a new color correction value) to be used for the color correction processing performed in the image correcting circuit 16 on the basis of the confidence level(s) (the details thereof will be described later) calculated in the confidence level calculating circuit 14, the significance level(s) (the details thereof will be described later) inputted from the input device 2, a color correction value obtained by the first color correction value calculating circuit 12, and a color correction value obtained by the second color correction value calculating circuit 13.

Color correction value calculation processing based on the skin color area and color correction value calculation processing based on the gray color area will be first described. In the color correction value calculation processing based on the skin color area and the color correction value calculation processing based on the gray color area, the face area partitioning circuit 11, the first color correction value calculating circuit 12, and the second color correction value calculating circuit 13 are operated.

An image represented by the original image data (hereinafter referred to as an original image) shall include an image area representing the face of a character (hereinafter referred to as a face image portion) and include a gray image area (an image area representing an object in a gray color, for example; hereinafter referred to as a gray image portion). The original image data representing the image including the face image portion and the gray image portion is read out of the storage device 4.

The original image data read out of the storage device 4 is inputted to each of the face area partitioning circuit 11, the first color correction value calculating circuit 12, and the second color correction value calculating circuit 13.

The face area partitioning circuit 11 performs processing for partitioning off the face image portion included in the original image. For the processing for partitioning off the face image portion, which is performed in the face area partitioning circuit 11, various types of conventional or new partitioning (detecting) methods can be used. For example, a method of dividing an image into a plurality of areas to perform photometry, converting data obtained by the photometry into hue and saturation, to crate their two-dimensional histogram, decomposing the histogram for each single-peaked mountain, further judging to which of the mountains each of pixels composing the image belongs, to decompose the pixel into groups corresponding to the mountains, dividing the image for each of the groups, to extract a face candidate area, and comparing the image size of the extracted area and image size obtained from main image size information, to extract an area where they are best matched with each other as a face area can be employed (see JP-A-5-100328). A method of dividing an image into a plurality of areas, detecting a shape pattern representing the contour of the head of a character after excluding a non-character area, detecting a face candidate area depending on the detected pattern, further respectively detecting a shape pattern representing the contour of the face of the character, a shape pattern representing the internal structure of the face, and a shape pattern representing the contour of the body of the character, judging consistency of the face candidate area by the detected patterns, and judging an area, where accuracy is the highest, corresponding to the face of the character, to extract a face image area may be used (see JP-A-8-122944). A method of setting a learning frame within an image, learning image data representing an image portion defined by the learning frame, to extract one or a plurality of representative feature vectors representing the learning frame, setting a search frame within the image, and extracting a subject area from the search frame on the basis of the degrees of similarity between each of the representative feature vectors and a plurality of feature vectors extracted from image data representing an image portion defined by the search frame (JP-A-2004-220555) can be also used.

Of course, an operator of the digital printing system may partition off the face image portion within the original image from the other image portion using the input device 2 (the mouse, etc.) (manual face area partitioning). In this case, the face area partitioning circuit 11 is not necessarily required for the image correcting apparatus 11.

Figure 3A:
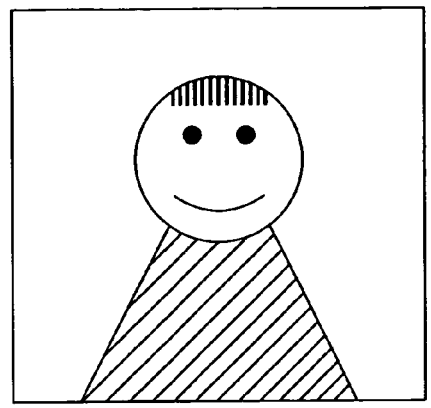
FIGS. 3A, 3B, and 3C respectively show an example of an image represented by original image data, how a face image portion is partitioned off (detected), and an example of a mask image.
Figure 3B:
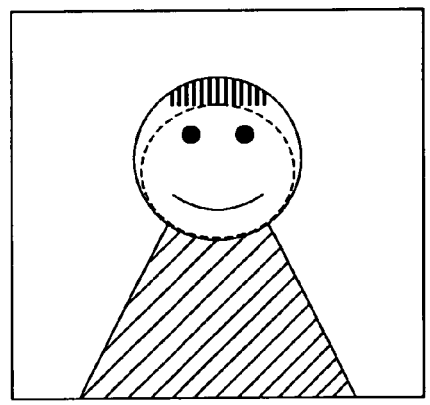
Figure 3C:
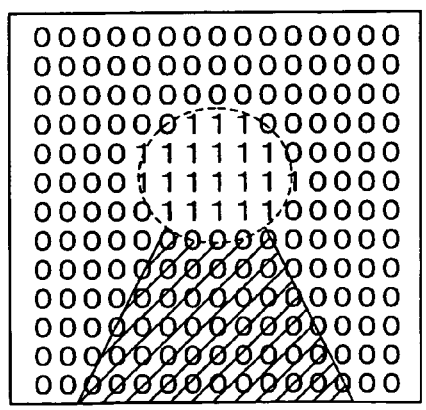

The face area partitioning circuit 11 outputs binary data in which each of pixels included in a face image portion obtained by partitioning (detection) is taken as one (or zero) and each of pixels included in an image portion other than the face image portion (outside the face image portion) is taken as zero (or one) (data to which one or zero corresponds for each pixel address). FIGS. 3A, 3B, and 3C respectively schematically show an example of the original image, how the face image portion is partitioned off by the face area partitioning circuit 11, and binary data (mask data), in which each of pixels included in the face image portion is taken as one and each of pixels included in the image portion other than the face image portion is taken as zero, outputted from the face area partitioning circuit 11.

The binary data outputted from the face area partitioning circuit 11 indicates a position and a range (area position) of the face image portion included in the original image. The binary data outputted from the face area partitioning circuit 11 is referred to as face area information.

The face area information outputted from the face area partitioning circuit 11 is inputted to each of the first color correction value calculating circuit 12 and the second color correction value calculating circuit 13. A target skin color chromaticity value (an ideal chromaticity value appropriate for chromaticity representing a skin color) inputted from the input device 2 is also inputted to each of the first color correction value calculating circuit 12 and the second color correction value calculating circuit 13.

The first color correction value calculating circuit 12 is a circuit for calculating a color correction value (coefficient) for making color correction such that the color (skin color) of the face image portion (a portion reliably including a lot of pixels in a skin color) has a chromaticity value conforming to the target skin color chromaticity value. The second color correction value calculating circuit 13 is a circuit for calculating a color correction value (coefficient) for making color correction such that a gray image portion has a chromaticity value conforming to the target gray color chromaticity value. The first color correction value calculating circuit 12 and the second color correction value calculating circuit 13 are common in that both the circuits are for calculating a color correction value, although they differ in an image portion used for calculating a color correction value, color correction value calculation processing, an algorithm, and so forth.

The first color correction value calculating circuit 12 extracts data representing the face image portion included in the original image data using the face area information fed from the face area partitioning circuit 11, and calculates a representative RGB value (e.g., an average RGB value) obtained from an RGB value for each pixel composing the face image portion represented by the extracted data representing the face image portion. A gain coefficient for an R value, a gain coefficient for a G value, and a gain coefficient for a B value are calculated on the basis of an average skin color chromaticity value obtained by converting the average RGB value into a chromaticity value and the target skin color chromaticity value inputted from the input device 2. For example, the gain coefficients can be calculated by a method (a method of calculating gain coefficients utilizing a chromaticity value) described in JP-A-2000-182043.

An input/output relationship expressed by the following equation 1 is obtained using a gain coefficient $G_{r1}$ for the R value, a gain coefficient $G_{g1}$ for the G value, and a gain coefficient $G_{b1}$ for the B value that are obtained by the first color correction value calculating circuit 12 (they are generically referred to as a first gain coefficient):

$$R_1 = G_{r1} \cdot R$$

$$G_1 = G_{g1} \cdot G$$

$$B_1 = G_{b1} \cdot B \qquad \text{equation 1}$$

In the equation 1, R, G, and B respectively indicate an R value, a G value, and a B value for each of the pixels composing the original image, and $R_1$, $G_1$, and $B_1$ respectively indicate an R value, a G value, and B value after color correction, in a case where color correction processing based on the gain coefficients is performed, obtained by the first color correction value calculating circuit 12.

The first color correction value calculating circuit 12 is for calculating the gain coefficients $G_{r1}$, $G_{g1}$, and $G_{b1}$, and does not make image correction itself. The equation 1 shall be represented by the following equation 2 for convenience of illustration:

Color correction value based on skin color area (first gain coefficient)=$(G_{r1}, G_{g1}, G_{b1})$ equation 2

The first gain coefficient can be also found using the chromaticity value, or can be also found on the basis of the RGB value or an antilog RGB value. Further, the first gain coefficient can be further adjusted such that the brightness of the image is not changed by the color correction.

The second color correction value calculating circuit 13 can calculate a gain coefficient for an R value, a gain coefficient for a G value, and a gain coefficient for a B value on the basis of a method described in JP-A-2003-209856, for example. The gain coefficients can be calculated in the following manner:

(i) A representative RGB value (e.g., an average RGB value) in a face image portion (a skin color area) is found, the found average RGB value is converted into a chromaticity value (an average skin color chromaticity value), and an average skin color temperature corresponding to the average skin color chromaticity value obtained by the conversion is obtained.

(ii) A target skin color temperature corresponding to the target skin color chromaticity value inputted from the input device 2 is obtained.

(iii) A gray color temperature (a target gray color temperature) corresponding to the target skin color temperature is found, and a target gray color chromaticity value corresponding to the found target gray color temperature is found.

(iv) A gray color area (a gray color pixel group) in the original image is detected utilizing at least the average skin color temperature in the face image portion.

(v) A chromaticity (e.g., an average gray color chromaticity) representing the detected gray color area is found.

(vi) The average skin color temperature and the average gray color chromaticity are corrected such that the number of pixels composing the gray color area (the gray color pixel group) reaches a maximum (step (iv) to step (vi) are repeated).

(vii) A gain coefficient $G_{r2}$ for the R value, a gain coefficient $G_{g2}$ for the G value, and a gain coefficient $G_{b2}$ for the B value are calculated on the basis of the target gray color chromaticity and the corrected average gray color chromaticity and the average gray color chromaticity before the correction.

An input/output relationship expressed by the following equation 3 is obtained using the gain coefficients $G_{r2}$, $G_{g2}$, and $G_{b2}$ obtained by the second color correction value calculating circuit 13 (they are generically referred to as a second gain coefficient):

$$R_2 = G_{r2} \cdot R$$

$$G_2 = G_{g2} \cdot G$$

$$B_2 G_{b2} \cdot B \qquad \text{equation 3}$$

In the equation 3, R, G, and B respectively indicate an R value, a G value, and a B value for each of the pixels composing the original image, and $R_2$, $G_2$, and $B_2$ respectively indicate an R value, a G value, and B value after color correction, in a case where color correction processing based on the gain coefficients is performed, obtained by the second color correction value calculating circuit 13.

The second color correction value calculating circuit 13 is for calculating the gain coefficients $G_{r2}$, $G_{g2}$, and $G_{b2}$, and does not make image correction itself. The equation 3 shall be represented by the following equation 4 for convenience of illustration:

Color correction value based on gray color area (second gain coefficient)=$(G_{r2}, G_{g2}, G_{b2})$  equation 4

Both the color correction value (the first gain coefficient) calculated by the first color correction value calculating circuit 12 and the color correction value (the second gain coefficient) calculated by the second color correction value calculating circuit 13 are fed to the confidence level calculating circuit 14.

Processing performed by the confidence level calculating circuit 14 will be then described.

To the confidence level calculating circuit 14, the original image data, the face area information outputted from the face area partitioning circuit 11, the color correction value (first gain coefficient) based on the skin color area, the color correction value (second gain coefficient) based on the gray color area, and the target skin color chromaticity value inputted from the input device 2 are inputted.

The confidence level calculating circuit 14 finds, when the original image data is color-corrected using the color correction value (first gain coefficient) calculated in the first color correction value calculating circuit 12 and the color correction value (second gain coefficient) calculated in the second color correction value calculating circuit 13, to what extent the color of the image after the correction is discrepant from the color of a target image, to obtain a numerical value (the numerical value is referred to as a "confidence level") given depending on the degree of the discrepancy.

Several methods can be employed for calculating the confidence level (which may be referred to as accuracy level or relevance level). However, the representative confidence level calculation will be herein described in detail.

Figure 4:
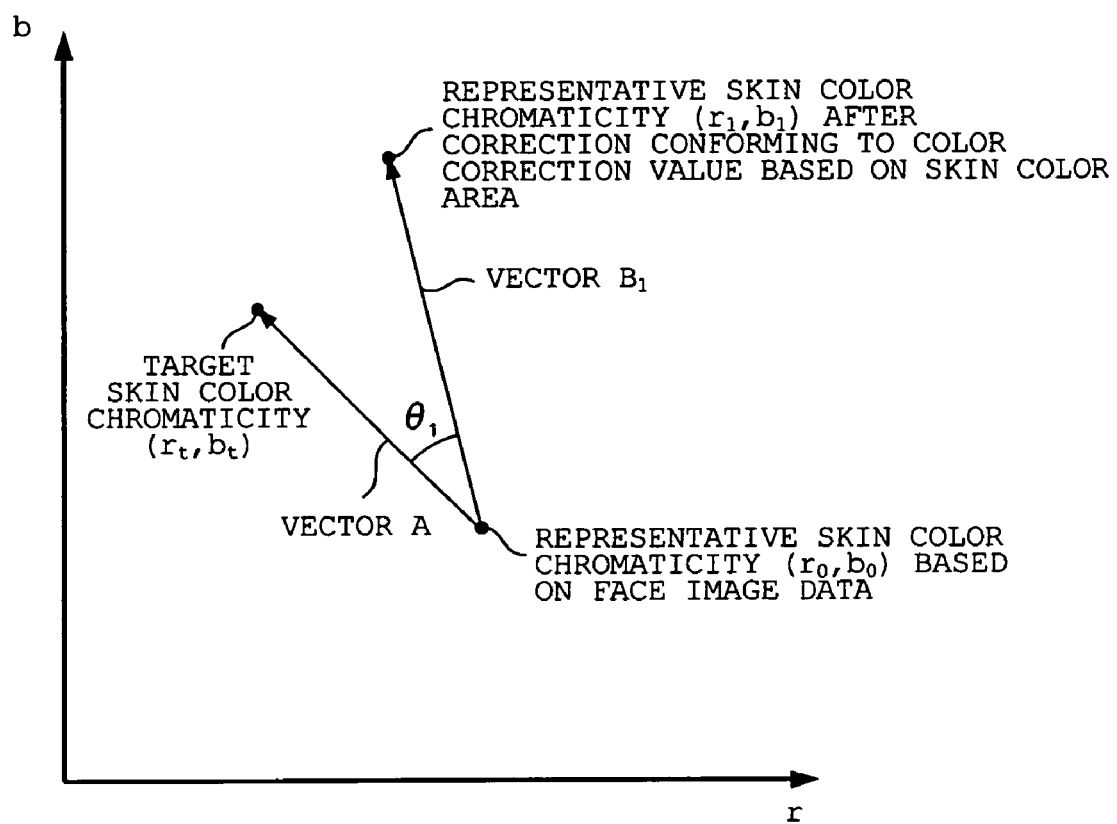
FIG. 4 shows an angle formed between a line segment vector for connecting a representative skin color chromaticity value and a target skin color chromaticity value and a line segment vector for connecting a representative skin color chromaticity value and a representative skin color chromaticity value after correction conforming to one color correction value.
Figure 5:
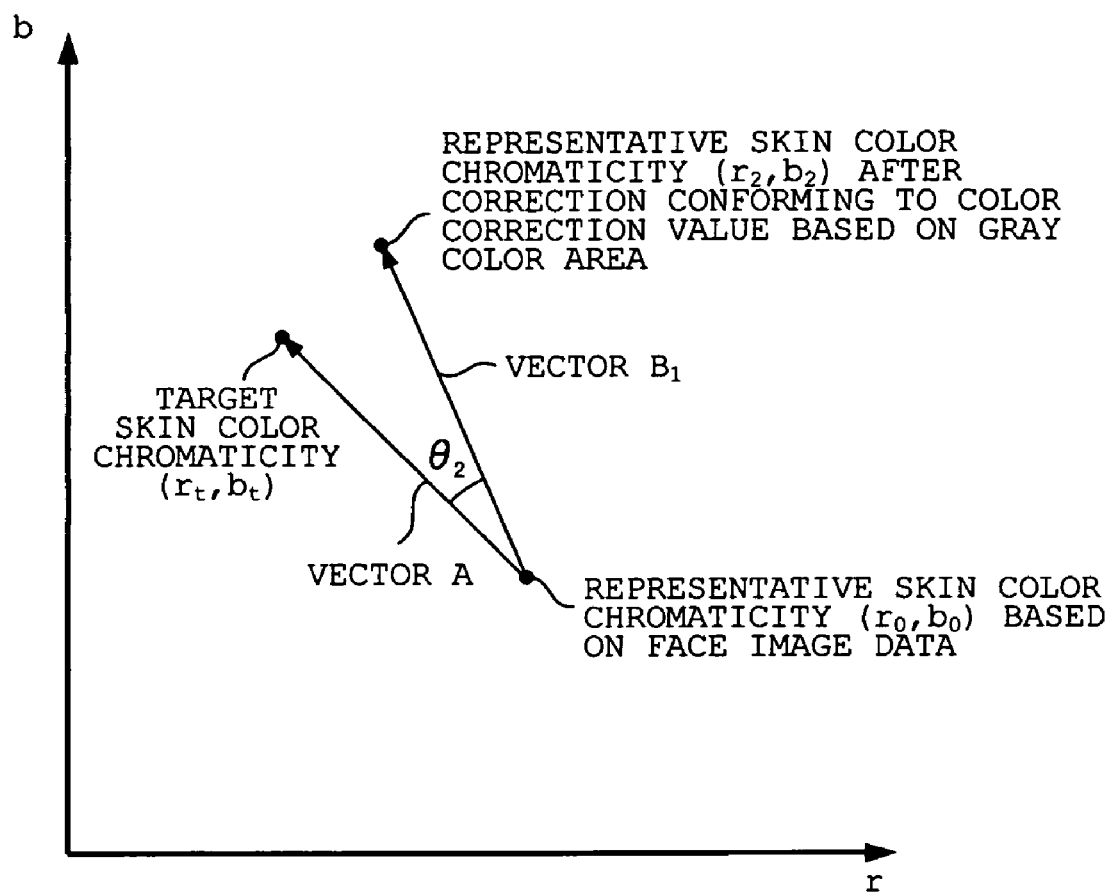
FIG. 5 shows an angle formed between a line segment vector for connecting a representative skin color chromaticity value and a target skin color chromaticity value and a line segment vector for connecting a representative skin color chromaticity value and a representative skin color chromaticity value after correction conforming to another color correction value.

In the representative confidence level calculation, a chromaticity space (an rb space) is utilized. FIGS. 4 and 5 respectively illustrate chromaticity spaces (rb spaces).

The following three points are plotted in the chromaticity space shown in FIG. 4.

(1) A representative skin color chromaticity value (r0, b0) based on data representing a face image portion (a skin color area) in an original image (for example, an average chromaticity value in the face image portion is a representative skin color chromaticity value)

(2) A target skin color chromaticity value (rt, bt) (inputted from the input device 2)

(3) A representative skin color chromaticity value (r1, b1) after color correction conforming to a color correction value (a first gain coefficient) based on a skin color area The following three points are plotted in the chromaticity space shown in FIG. 5.

(1) A representative skin color chromaticity value (r0, b0) based on data representing a face image portion (a skin color area) in an original image (2) A target skin color chromaticity value (rt, bt)

(3) A representative skin color chromaticity value (r2, b2) after color correction conforming to a color correction value (a second gain coefficient) based on a gray color area The chromaticity space shown in FIG. 4 indicates that when the color correction based on the foregoing equation 1 is temporarily made, the representative skin color chromaticity value (ro, bo) is color-corrected to the representative skin color chromaticity value (r1, b1) after the color correction (a line segment vector B1), although the representative skin color chromaticity value (ro, bo) is ideally color-corrected so as to have the target skin color chromaticity value (rt, bt) (a line segment vector A). In the chromaticity space shown in FIG. 4, an angle θ1 formed between the line segment vector A and the line segment vector B1 is handled as a discrepancy level from ideal color correction in a case where color correction is made using the color correction value (gain coefficient) obtained by the first color correction value calculating circuit 12.

In the same manner, the chromaticity space shown in FIG. 5 indicates that when the color correction based on the foregoing equation 3 is temporarily made, the representative skin color chromaticity value (ro, bo) is color-corrected to the representative skin color chromaticity value (r2, b2) after the color correction (a line segment vector B2), although the representative skin color chromaticity value (ro, bo) is ideally color-corrected so as to have the target skin color chromaticity value (rt, bt) (a line segment vector A). In the chromaticity space shown in FIG. 5, an angle θ2 formed between the line segment vector A and the line segment vector B1 is handled as a discrepancy level from ideal color correction in a case where color correction is made using the color correction value (gain coefficient) obtained by the second color correction value calculating circuit 13.

Figure 6:
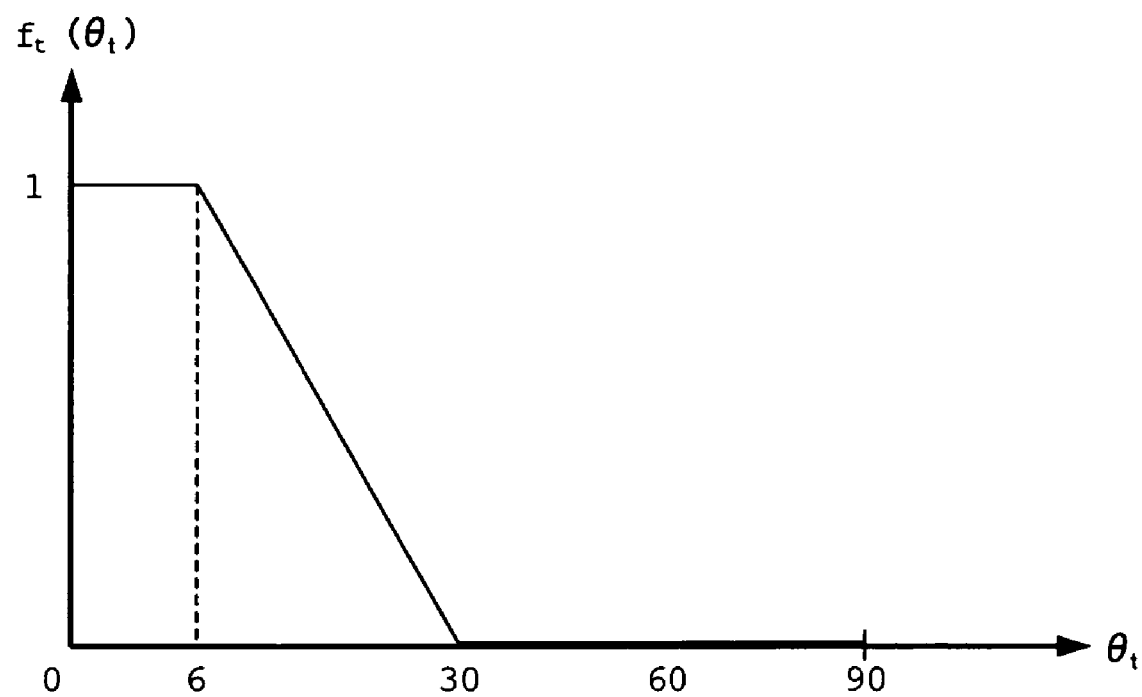
FIG. 6 is a function graph for calculating a confidence level.

FIG. 6 illustrates an example of a function graph showing the relationship between an angle (θt) (t=1, 2, . . . ) representing the above-mentioned discrepancy level and a confidence level (ft (θt)) calculated depending on the angle. The confidence level is obtained as any one of values 0 to 1.

Although description was made of the representative confidence level calculation, the magnitudes of the line segment vector B1 and the line segment vector B2 may be taken as confidence levels, or the directions of the line segment vectors B1 and the line segment vector B2 may be taken as confidence levels. Further, the confidence levels may be calculated on the basis of the extent to which a representative skin color is close to a skin blackbody locus and the extent to which a representative gray color is close to a gray blackbody locus. A value obtained by multiplying any of or all of the plurality of confidence levels may be a confidence level. In any case, the confidence level calculating circuit 14 respectively calculates the confidence levels depending on the extent to which the color of the image after the correction is discrepant from the color of the target image with respect to the color correction value (first gain coefficient) calculated in the first color correction value calculating circuit 12 and the color correction value (second gain coefficient) calculated in the second color correction value calculating circuit 13.

The confidence level for the color correction value based on the skin color area (hereinafter referred to as a skin color confidence level) and the confidence level for the color correction value based on the gray color area (hereinafter referred to as a gray color confidence level), that are obtained by the confidence level calculating circuit 14, are inputted to the significance/confidence-based color correction value calculating circuit 15.

Processing of the significance/confidence-based color correction value calculating circuit 15 will be then described. The skin color confidence level, the gray color confidence level, and the significance levels inputted from the input device 2 are inputted to the significance/confidence-based color correction value calculating circuit 15. The significance level is a value indicating to what extent either one of the color correction value (first gain coefficient) calculated in the first color correction value calculating circuit 12 and the color correction value (second gain coefficient) calculated in the second color correction value calculating circuit 13 is attached importance to, and is a value on which a user's taste (request) is reflected.

The significance/confidence-based color correction value calculating circuit 15 performs any one of three types of calculation processings, described below.

(First Calculation Processing)

In the first calculation processing, a color correction value (Gr, Gg, Gb) (hereinafter referred to as a "new color correction value) based on significance and confidence is calculated by the following equation 5.

$$(G_r, G_g, G_b) = \sum_{t=1}^{k}(G_{rt}, G_{gt}, G_{bt}) \cdot w_t \qquad \text{equation 5}$$

In the equation 5, a weight wt is expressed by the following equations 6 and 7:

$$W_t = I_t \cdot C_t \bigg/ \left[\sum_{t=1}^{k} I_t \cdot C_t\right] \qquad \text{equation 6}$$

$$\sum_{t=1}^{k} W_t = 1 \qquad \text{equation 7}$$

In the equations 5 to 7, a variable "t" is for distinguishing the types of color correction values (or color correction value calculating circuits). In the present embodiment, two types of color correction values are calculated, so that "t"=1 or "t"=2. A variable "k" is the number of color correction values to be calculated. In the present embodiment, "k"=2. Further, wt in the equations 5 to 7 (w1 and w2 in the present embodiment) indicates the weight of each of the color correction values to be calculated. In the equation 6, It (I1 and I2 in the present embodiment) indicates a significance level(s) for each of the color correction values inputted from the input device 2, and Ct (C1 and C2 in the present embodiment) indicates a confidence level(s) for each of the color correction values. The same is true for the second calculation processing and the third calculation processing, described later.

In the first calculation processing (correction value calculation based on the equations 5 to 7), it is found that the color correction value having a higher confidence level is more greatly reflected on the new color correction value (Gr, Gg, Gb), and the color correction value having a higher significance level is more greatly reflected on the new color correction value (Gr, Gg, Gb). A new color correction value that is dependent on which of the color correction values is attached importance to by a user (a user's taste) and on which a more appropriate color correction value is reflected can be obtained.

When the new color correction value is calculated on the basis of only the confidence level, it goes without saying that two significance levels inputted from the input device 2 may be taken as the same value (e.g., I1=1, I2=1).

(Second Calculation Processing)

In the second calculation processing, a new color correction value (Gr, Gg, Gb) is calculated by the following equation 8:

$$(G_r, G_g, G_b) =  \qquad \text{equation 8}$$
$$\sum_{t=1}^{k}\{[L(G_{rt}, C_t), L(G_{gt}, C_t), L(G_{bt}, C_t)]\} \cdot W_t \text{ where}$$

$$L(G_{gt}, C_t) = (G_{rt} - 1) \cdot C_t + 1$$

-continued
$$L(G_{gt}, C_t) = (G_{gt} - 1) \cdot C_t + 1$$
$$L(G_{bt}, C_t) = (G_{bt} - 1) \cdot C_t + 1$$

In the equation 8, a weight wt is expressed by the following equation 9:

$$W_t = I_t \bigg/ \left[\sum_{t=1}^{k} I_t\right] \qquad \text{equation 9}$$

In the second calculation processing (the equations 8 and 9), a new color correction value on which a significance level is more greatly reflected is obtained. The second calculation processing is the same as the first calculation processing in that a value obtained by adding all weights wt is "1" (the foregoing equation 7).

(Third Calculation Processing)

The third calculation processing is the same as the second calculation processing in that a new color correction value (Gr, Gg, Gb) is calculated by the foregoing equation 8, and differs therefrom in that a weight wt is expressed by the following equation 10;

$$W_t = I_t \cdot C_t \bigg/ \left[\sum_{t=1}^{k} I_t \cdot C_t\right] \qquad \text{equation 10}$$

In the third calculation processing (the equations 8 and 10), a new color correction value on which a confidence level Ct is more greatly reflected is obtained. The third calculation processing is the same as the first calculation processing in that a value obtained by adding all weights wt is "1" (the foregoing equation 7).

Judgment which of the first to third calculation processings should be used may be selected using the input device 2 by the user, for example. A new color correction value (Gr, Gg, Gb) is calculated by any one of the first to third calculation processings.

The new color correction value (Gr, Gg, Gb) calculated in the significance/confidence-based color correction value calculating circuit 15 is inputted to the image correcting circuit 16. Original image data (which may be only data representing a face image portion) is color-corrected on the basis of the new color correction value (Gr, Gg, Gb).

In a case where the color correction value (first gain coefficient) calculated in the first color correction value calculating circuit 12 and the color correction value (second gain coefficient) calculated in the second color correction value calculating circuit 13 entirely differ from each other (e.g., a case where the directions of the line segment vector B1 and the line segment vector B2 entirely differ from each other), there is a high possibility that the calculation of any of the color correction values fails. In such a case, a color correction effect produced by the new color correction value (Gr, Gg, Gb) may be weakened in the image correcting circuit 16.

Although in the above-mentioned embodiment, the new color correction value is calculated on the basis of the color correction value calculated by the first color correction value calculating circuit 12 and the color correction value calculated by the second color correction value calculating circuit 13, a color correction value calculated by another method (e.g., a color correction value calculated on the basis of color correction value calculation processing described in JP-A-2000-148978) may be used in place of or in addition to either one of the two color correction values calculated in the present embodiment.

Although in the above-mentioned embodiment, the weight and the confidence level are calculated and the significance level is inputted for each of the color correction value calculating circuits (color correction values), the weight and the confidence level may be calculated and the significance level may be inputted independently for each of RGB colors.

Although in the above-mentioned embodiment, the gain coefficient is used for the color correction value, it goes without saying that a look-up table storing a correspondence between an input value and an output value may be taken as a color correction value in place of the gain coefficient.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image correcting apparatus comprising:
   a plurality of types of color correction value calculation means for respectively calculating a plurality of color correction values by different color correction value calculation processings on the basis of given image data;
   confidence level calculation means for respectively calculating confidence levels for the plurality of color correction values calculated by the plurality of types of color correction value calculation means;
   adding color correction value calculation means for calculating a new color correction value obtained by respectively weighting the plurality of color correction values using the confidence levels for the plurality of color correction values calculated by the confidence level calculation means and adding the weighted plurality of color correction values; and
   correction means for color-correcting the image data on the basis of the new color correction value calculated by the adding color correction value calculation means.

2. The image correcting apparatus according to claim 1, further comprising
   significance level input means for respectively inputting significance levels for the plurality of color correction values calculated by the plurality of types of color correction value calculation means, the adding color correction value calculation means respectively weighting the plurality of color correction values using the confidence levels for the plurality of color correction values calculated by the confidence level calculation means and the significance levels for the plurality of color correction values inputted from the significance level input means.

3. The image correcting apparatus according to claim 2, wherein the confidence level calculation means respectively calculates the confidence levels for the plurality of color correction values on the basis of color information relating to a representative color included in the image data, ideal color information relating to the representative color, and a plurality of corrected color information obtained by correcting the color information on the basis of the plurality of color correction values calculated by the plurality of types of color correction value calculation means.

4. The image correcting apparatus according to claim 3, wherein the confidence level calculation means respectively calculates, in a color space, the confidence levels for the plurality of color correction values depending on an angle formed between an ideal line segment vector obtained by connecting the color information and the ideal color information and each of a plurality of correction line segment vectors obtained by connecting the color information and the plurality of corrected color information.

5. The image correcting apparatus according to claim 3, wherein the confidence level calculation means respectively calculates, in a color space, the confidence levels for the plurality of color correction values on the basis of the magnitudes of the plurality of correction line segment vectors obtained by connecting the color information and the plurality of corrected color information.

6. The image correcting apparatus according to claim 3, wherein the confidence level calculation means respectively calculates, in a color space, the confidence levels for the plurality of color correction values on the basis of the directions of the plurality of correction line segment vectors obtained by connecting the color information and the plurality of corrected color information.

7. The image correcting apparatus according to claim 1, wherein the confidence level calculation means respectively calculates the confidence levels for the plurality of color correction values on the basis of color information relating to a representative color included in the image data, ideal color information relating to the representative color, and a plurality of corrected color information obtained by correcting the color information on the basis of the plurality of color correction values calculated by the plurality of types of color correction value calculation means.

8. The image correcting apparatus according to claim 7, wherein the confidence level calculation means respectively calculates, in a color space, the confidence levels for the plurality of color correction values depending on an angle formed between an ideal line segment vector obtained by connecting the color information and the ideal color information and each of a plurality of correction line segment vectors obtained by connecting the color information and the plurality of corrected color information.

9. The image correcting apparatus according to claim 7, wherein the confidence level calculation means respectively calculates, in a color space, the confidence levels for the plurality of color correction values on the basis of the magnitudes of the plurality of correction line segment vectors obtained by connecting the color information and the plurality of corrected color information.

10. The image correcting apparatus according to claim 7, wherein the confidence level calculation means respectively calculates, in a color space, the confidence levels for the plurality of color correction values on the basis of the directions of the plurality of correction line segment vectors obtained by connecting the color information and the plurality of corrected color information.

11. The image correcting apparatus according to claim 1, further comprising a face area partitioning means for partitioning off a face image of the image data,
   wherein at least one of the plurality of color correction value calculation means calculates a color correction value for correcting skin color comprising a chromaticity value corresponding to a target skin color chromaticity value.

12. The image correcting apparatus according to claim 11, wherein the color correction calculation means calculates the color correction value for correcting skin color by extracting data representing a face image portion of the image data from the face area partitioning means; calculating a R value, a G value, and a B value for each pixel of the face image portion; calculating a plurality of gain coefficient corresponding to each R, G, and B, value based on an average skin color chromaticity value and the target skin color chromaticity value; and multiplying each gain coefficient with the corresponding R, G, and B values.

13. The image correcting apparatus according to claim 1, wherein at least one of the plurality of color correction value calculation means calculates a color correction value correcting grey color comprising a chromaticity value corresponding to a target gray color chromaticity value.

14. The apparatus of claim 1, wherein a weighting coefficient is applied respectively for each of the plurality of types of color correction value calculation means and the weighted plurality of color correction values are added together to provide the new correction value.

15. A computer-readable recording medium storing an image correction program for causing a computer to perform:
   processing for respectively calculating a plurality of color correction values by different color correction value calculation processings on the basis of given image data;
   processing for respectively calculating confidence levels for the plurality of color correction values;
   processing for calculating a new color correction value obtained by respectively weighting the plurality of color correction values using the calculated confidence levels for the plurality of color correction values and adding the weighted plurality of color correction values; and
   processing for color-correcting the image data on the basis of the calculated new color correction value.

16. The computer-readable medium storing the image correction program according to claim 15, wherein
   the computer is caused to further perform processing for accepting the input of significance levels for the calculated plurality of color correction values, and the processing for calculating the new color correction value is for respectively weighting the plurality of color correction values using the calculated confidence levels for the plurality of color correction values and the inputted significance levels for the plurality of color correction values.

17. An image correcting apparatus comprising:
   a plurality of types of color correction value calculation device for respectively calculating a plurality of color correction values by different color correction value calculation processings on the basis of given image data;
   confidence level calculation device for respectively calculating confidence levels for the plurality of color correction values calculated by the plurality of types of color correction value calculation device;
   adding color correction value calculation device for calculating a new color correction value obtained by respectively weighting the plurality of color correction values using the confidence levels for the plurality of color correction values calculated by the confidence level calculation device and adding the weighted plurality of color correction values; and
   correction device for color-correcting the image data on the basis of the new color correction value calculated by the adding color correction value calculation device.

* * * * *